Dec. 30, 1947.  D. DALIN ET AL  2,433,547
METHOD OF UTILIZING HEAT OF WASTE GASES FOR STEAM GENERATION
Filed April 19, 1944
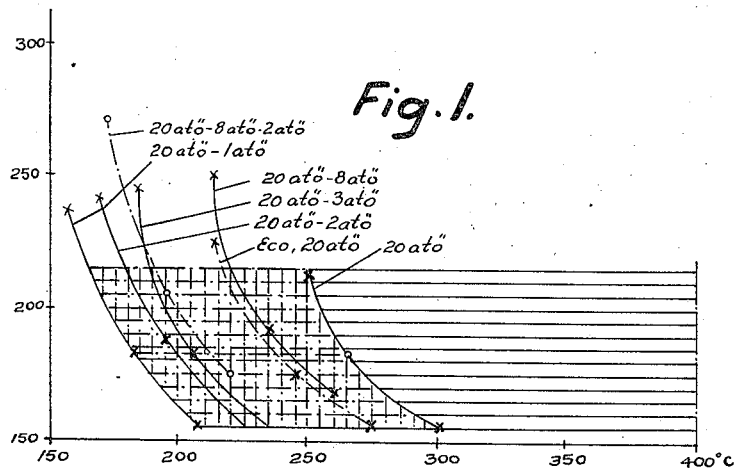
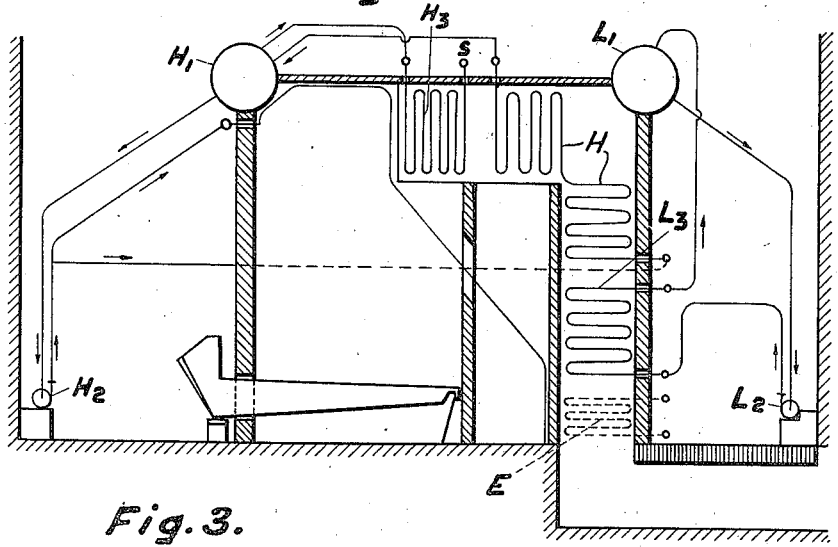
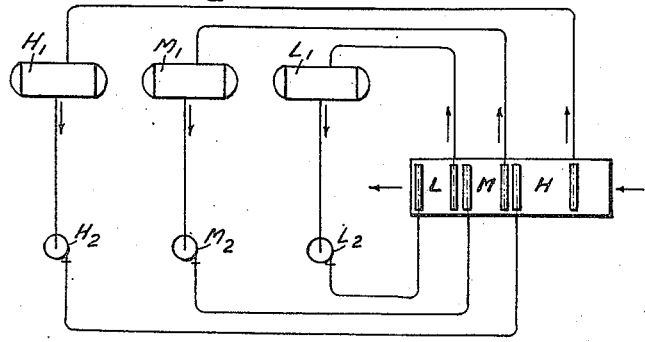
Inventors:
David Dalin,
Gustav Hagby,
by Pierce·Scheffler
Attorneys.

Patented Dec. 30, 1947

2,433,547

UNITED STATES PATENT OFFICE 2,433,547

METHOD OF UTILIZING HEAT OF WASTE GASES FOR STEAM GENERATION

David Dalin, Sodertalje, and Gustav Hagby, Ostertalje, Sweden

Application April 19, 1944, Serial No. 531,834
In Sweden April 22, 1943

1 Claim. (Cl. 122—7)

This invention relates to steam generating methods and has as its general object the generation of steam by a method which utilizes as much as is economically practicable of the heat of relatively low temperature waste gases issuing from furnaces employed for other than steam generating purposes, and used in various manufacturing processes.

In many mills and manufacturing plants where steam is used for the generation of power as well as for heating purposes, it is essential that steam be available at two or more pressures, high pressure steam of approximately 20 to 40 atmospheres for power generation, and low pressure steam between slightly higher than atmospheric pressure up to about 8 atmospheres for heating.

The present invention has as its chief purpose the generation of steam at such high and low pressures for power generating and heating purposes respectively from a source of relatively low temperature waste combustion gases.

To this end the invention is characterized by the forced feeding of boiler water from the accumulators to the tubes of a number of independent waste gas boilers over which the combustion gases flow serially, in a manner such that steam at different pressures is generated in the tubes of the different boilers at temperatures near that of the water delivered to the tubes to thereby assure the absorption of large quantities of heat from the waste gases at the successive boiler stages.

More specifically the invention contemplates the provision of two or more waste gas steam boilers located serially in a waste gas flue and each adapted to maintain a lower steam pressure than the preceding boiler in the direction of flow of the waste gases so as to effect a stepwise recovery of the heat of the waste gases, and to so control and maintain the pressure-temperature characteristics of the boilers with respect to each other and the waste gases as to secure the optimum conditions of heat transfer between the low temperature waste gases and the boilers at each stage thereof with the result that practically all of the heat of the waste gases capable of economically generating steam is extracted.

With the above and other objects in view which will appear as the description proceeds, this invention resides in the novel method substantially as hereinafter described and more particularly defined by the appended claim, it being understood that such changes in the precise embodiment of the herein disclosed invention may be made as come within the scope of the claim.

The accompanying drawings illustrate two sources of waste combustion gases the heat of which may be utilized for the generation of steam at a number of different pressures in accordance with the method of this invention, and in which:

Figure 1 is a graph serving to show the advantage of employing waste gas boilers to generate steam at a plurality of different pressures utilizing the heat of waste combustion gases;

Figure 2 is a diagrammatic view of a steam generating plant adapted for the practice of this invention; and Figure 3 is a diagrammatic view illustrating the manner in which steam at a plurality of different pressures, specifically three, may be generated from the heat of relatively low temperature waste flue gases issuing from a furnace used for some manufacturing process.

Referring now particularly to the accompanying drawings and especially to Figure 1, which graphically illustrates the heating surface required, under certain conditions, for the generation of 1000 kg. of steam from relatively low temperature waste combustion gases, temperature in degrees centigrade is set off along the abscissa and the heating surface in m.$^2$ (square meters) is set off along the ordinate. The various curves indicate generated steam pressure (above atmospheric).

For the sake of simplicity, it may be assumed that the waste flue gases available for the generation of steam are first passed over the tubes of a superheater and that the gas temperature is about 400° C. when leaving the superheater.

In order to depict the advantages of the method of this invention, the curves which have been plotted on the graph show to what extent it is possible to utilize the heat of the waste gas leaving the superheater if the gases are first caused to pass over the tubes of a high pressure boiler generating steam at a pressure of 20 atmospheres, as indicated by the curve 20 atö (20 atmospheres), and then over the tubes of one or more low pressure waste gas boilers.

The curve 20 atö—2 atö indicates that steam at 20 atmospheres pressure is generated in the high pressure waste gas boiler while steam at 2 atmospheres pressure is generated in a low pressure waste gas boiler having tubes over which the waste gases flow after passing over the tubes of the high pressure boiler.

According to the graph, if a boiler unit of a size corresponding to 183 m.$^2$ heating surface per 1000 kg. generated steam is selected, it is possible with a high pressure waste gas boiler to reclaim a heat quantity from the waste gases corresponding to a reduction of the temperature of the waste gases from 400° to 265° C., and by practice of the method of this invention wherein an independent low pressure waste gas boiler generating steam at 2 atmospheres pressure is acted upon by the waste gases after the high pressure boiler stage, an additional heat quantity is reclaimed from the waste gases corresponding to a further reduction of gas temperature from 265° to 198° C.

The steam quantity obtained by using the waste gas boiler for low pressure steam in combination with a high pressure waste gas boiler is approximately 1.5 times the steam quantity obtained when the high pressure steam boiler is used alone. With the two waste gas boilers generating high and low pressure steam therefore, a 50% increase in steam is obtained along with a high recovery of the heat of the waste gases.

Again referring to the graph, a curve designated 20 atö—8 atö—2 atö has been plotted to indicate that the method of this invention also encompasses a condition where the waste gas at about 400° C. is first passed over the tubes of a high pressure boiler in which steam at 20 atmospheres pressure is generated, then over the tubes of an intermediate pressure boiler in which steam at 8 atmospheres pressure is generated, and finally passed over the tubes of a low pressure boiler in which steam at two atmospheres pressure is generated.

While the total steam quantity obtained in this instance is not quite as great as where only a high and low pressure waste gas boiler is used, as previously described, the generation of steam at three different pressures nevertheless has advantages in plants where steam at a plurality of low pressures is desired for many purposes including heating.

In comparing the advantages of steam generation at a high of 20 atmospheres—along with a low of 2 atmospheres pressure, as first described, by the use of waste gas boilers having tubes over which the waste gases flow serially, the horizontal distance between the curved lines on the graph designated 20 atö and 20 atö—2 atö gives a relative indication of the amount of steam obtained, and thus the horizontal distance between the curve designated 20 atö—2 atö and the curve designated 20 atö—8 atö—2 atö indicates how much more steam is obtained when the boiler for the intermediate pressure (8 atmospheres) is eliminated.

The curve Eco. 20 atö represents a condition where an economizer is used after the high pressure waste gas boiler. In this instance a recovery of heat from the waste gases is effected corresponding to a reduction of gas temperature of, for example, 265° C. to 238.5° C. This represents a relatively low heat recovery when compared to the heat recovery effected when a low pressure boiler generating steam at 1 atmosphere pressure is employed in place of the economizer after the high pressure boiler. In this latter instance, the increased recovery of heat from the waste gases corresponds to a reduction of waste gas temperature from 265° C. after the high pressure boiler to 181.5° C. after the low pressure boiler, as shown by the curve 20 atö—1 atö. This increased heat recovery results in an increase in the quantity of steam obtained from the waste gas boiler system of this invention of approximately three times the amount obtained when an economizer is used after the high pressure boiler.

Steam at any desired pressure from 1 atmosphere to 8 atmospheres obtained from the use of low pressure boilers after the high pressure boiler generating steam at 20 atmospheres, is as a rule intended for heating purposes and hence may be largely used in place of the steam ordinarily generated in direct fired boilers used for the heating of manufacturing plants and the like. Obviously, if the heating requirements in certain plants are not too great, the waste gas boilers used in accordance with this invention may supply the steam required for the entire heating of the plant. In any event, fuel consumption in the direct fired boilers presently required is materially reduced by the quantity required to generate an amount of steam equal to the steam quantity obtained from the low pressure waste gas boilers of the present invention.

This method of recovering heat from waste gases for steam generating purposes is not only applicable to furnaces used in manufacturing processes, but also may be used in the flues of steam boiler plants as will appear more fully hereinafter. In some steam boiler plant installations, however, the waste combustion gases contain $SO_3$ and the temperature differential between the waste gases and the heat absorbing medium circulating through the waste gas boiler tubes must be limited to a value at which condensation and the consequent precipitation of sulphuric acid on the heating surface or tubes is avoided.

In such installations it is impossible to employ an economizer in the flue gas passage if the feed water entering the tubes of the economizer has a temperature of 100° C. or lower because of condensation and the precipitation of sulphuric acid on the economizer tubes. If the feed water is first heated to a high enough temperature prior to entering the economizer tubes, it will be readily seen that the advantages of an economizer are largely nullified since it will be incapable of recovering much of the heat of the flue gases.

According to the method of this invention, however, low pressure steam boilers may have their heating surfaces or tubes disposed in the flue gas passage after a high pressure boiler as hereinbefore described, and the low pressures may be controlled to assure the most advantageous temperatures of the mediums circulating through the low pressure boiler tubes so as to avoid any tendency of condensation occurring with resultant precipitation of sulphuric acid on the tubes at the low pressure boiler stages. In such cases the temperature within the heating surface is only dependent upon the pressure in the accumulators of the low pressure boiler or boilers and can be held at a suitably low but safe constant value independent of how much heat is supplied thereto.

Hence it will be seen that the method of this invention is based upon the use of high and low pressure waste gas boilers having tubes or heating surfaces disposed in the path of relatively low temperature waste gas issuing from a furnace or a steam generating plant and wherein the waste gas is caused to first pass over the tubes of a high pressure boiler where its heat is utilized to a degree economically suitable for the generation of steam at a relatively high pressure, and is thereafter caused to pass over the tubes or heating surfaces of one or more low pressure boilers generating steam at considerably lower steam pressures and temperatures, thus stepwise effecting recovery of all of the heat from the gases that can be economically employed for the generation of steam.

It should be observed that a certain temperature differential is necessary between the heat transmitting medium consisting of waste combustion or flue gases and the heat absorbing medium circulated through the waste gas boiler tubes and consisting of steam or steam water emulsion, in order to cause heat exchange between said mediums. The maintenance of different steam pressures and temperatures in the different boiler stages as described assures the desired temperature difference between the waste gases and the heat absorbing medium circulated through the tubes at the different boiler stages which is utilized in an advantageous and economic manner for effecting steam generation without the use of abnormally large heat absorbing surfaces.

Figure 2 of the drawings illustrates how the method of this invention may be adapted for use with a steam generating plant. The plant is here shown diagrammatically and has the usual draft duct through which hot flue gases discharge from the combustion chamber of the plant. In the present case the draft duct or flue gas passage is shown as comprising an upper horizontal duct section through which the flue gases initially flow and a vertical duct section communicating with the outer end of the upper horizontal duct section and extending downwardly therefrom to discharge into a lower passageway leading horizontally to the customary stack.

The plant is provided with the customary high pressure accumulator $H_1$ into which steam generated in heating surfaces lining the walls of the combustion chamber is delivered. Boiler water is drawn from the accumulator and delivered to these heating surfaces by means of a pump $H_2$.

Superheating coils $H_3$ may be advantageously located at the entrance to the upper horizontal duct section of the flue gas passage and are shown connected with the accumulator $H_1$ to be supplied with steam therefrom.

The heating surface H comprising the tubes of a waste gas boiler for generating steam at a high pressure, such as 20 atmospheres, is located in the draft duct after the superheater $H_3$, and according to Figure 2 the high pressure heating surface may be located partly in the upper draft duct and partly in the vertical section of the draft duct. It is important to note that the tubes or heating surface for the high pressure waste gas boiler are located to be contacted by the flue gases after passage thereof over the coils of the superheater $H_3$.

The tubes of the high pressure waste gas boiler H have their inlets connected with the pump $H_2$ and their outlets connected with the high pressure accumulator $H_1$ so that the pump forcefully delivers boiler water to the tubes for the generation of steam or a steam water emulsion therein, and effects the delivery of such steam or steam water emulsion to the high pressure accumulator $H_1$.

After serially passing over the coils of the superheater $H_3$ and the tubes H of the high pressure waste gas boiler, the flue gases pass over the low pressure boiler tubes $L_3$ located in the vertical section of the draft duct immediately below the heating surface H of the high pressure waste gas boiler.

The tubes $L_3$ have their outlet connected with a low pressure accumulator $L_1$, and a pump $L_2$ is provided to feed boiler water from the low pressure accumulator to the heating surface $L_3$ where the water is converted into steam or a steam water emulsion and the latter delivered to the low pressure accumulator.

It is again important to note that the pressure in the low pressure accumulator $L_1$ may be maintained at a value such as to assure the delivery of boiler water to the heating surface $L_3$ at a temperature sufficiently low with relation to the temperature of the gases leaving the surface H as to obtain maximum heat recovery from the gases and consequently maximum low pressure steam generation.

An economizer E indicated in dotted lines below the low pressure heating surface $L_3$ may be employed if desired along with a superheater (not shown) for low pressure.

Figure 3 diagrammatically shows a waste gas passage through which flows relatively low temperature combustion gases issuing from a furnace or the like used for other than steam generating purposes. Heating surfaces for high pressure, low pressure, and intermediate pressure waste gas boilers are located in this waste gas passage to recover the heat of the gases flowing therethrough for steam generating purposes. The heating surface for the high pressure boiler is again identified by the letter H, the heating surface for the intermediate pressure boiler is designated M and the heating surface for the low pressure boiler is designated L, and the arrangement of these surfaces is such that they are serially contacted by the waste combustion gases in the order named. Likewise, the pressure and corresponding boiler water temperature in each of the different boilers decreases in the direction of waste gas flow so that the temperature of the boiler water fed to the heating surfaces of the different boilers will always be at a temperature sufficiently lower than the temperature of the gases leaving a preceding heating surface as to obtain maximum heat recovery from the gases and consequently maximum steam generation.

The steam generated in the heating surface H is delivered to an accumulator $H_1$ as in the previous embodiment described, the steam at intermediate pressure such as 8 atmospheres generated in the heating surface M is delivered to an accumulator $M_1$, and the steam at one or two atmospheres pressure generated in the low pressure heating surface L is delivered to a low pressure accumulator $L_1$.

Suitable pumps $H_2$, $M_2$ and $L_2$ connect with the accumulators and heating surfaces to effect delivery of boiler water from the accumulators to the inlets of their respective heat absorbing surfaces or tube networks.

From the foregoing description taken in connection with the accompanying drawings, it will be apparent that the method of this invention enables substantially all of the heat to be reclaimed from waste combustion or flue gases that can be economically employed for the generation of steam useful for power generation and for heating purposes.

Having now described our invention, what we claim as new and desire to secure by Letters Patent is:

A method of generating steam at a plurality of different temperatures and related pressures from a common waste gas source, which comprises: passing the waste gas serially over the tubes of a plurality of steam boilers which are independent of one another and in which the tubes of each boiler constitute a separate boiler tube stage; maintaining forced circulation of boiler water from the accumulator of each boiler through its tubes and back to the accumulator in such a way as to effect generation of steam in the tubes of each boiler so that the fluid circulating through the tubes is a mixture of steam and water; and maintaining a substantial pressure-temperature differential between the boilers of adjacent tube stages with the pressure and related temperature in successive boilers decreasing in the direction of gas flow so as to make possible a sufficient temperature difference between the fluid circulated through the boiler tubes and the waste gas brought into heat transfer relationship therewith to effect maximum heat transfer and absorption of as much as possible of the heat from the waste gas flowing across the tubes whereby the temperature of the gas at each boiler tube stage approaches that of the fluid circulated through the tubes.

DAVID DALIN.
GUSTAV HAGBY.

REFERENCES CITED

The following references are of record in the file of this patent:

UNITED STATES PATENTS

| Number | Name | Date |
| --- | --- | --- |
| 1,839,125 | Smith | Dec. 29, 1931 |
| 2,358,358 | Stromquist | Sept. 19, 1944 |
| 1,927,095 | Lucke | Sept. 19, 1933 |
| 1,151,676 | Foersterling | Aug. 31, 1915 |
| 1,151,831 | Semmler | Aug. 31, 1915 |
| 1,759,718 | Smith | May 20, 1930 |
| 226,405 | Jurisch et al. | Apr. 13, 1880 |

FOREIGN PATENTS

| Number | Country | Date |
| --- | --- | --- |
| 493,443 | Great Britain | Oct. 3, 1938 |